United States Patent
Katada (10) Patent No.: US 10,505,436 B2
(45) Date of Patent: Dec. 10, 2019

(54) LINEAR VIBRATION MOTOR

(71) Applicant: Nidec Copal Corporation, Tokyo (JP)

(72) Inventor: Yoshinori Katada, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 85 days.

(21) Appl. No.: 15/738,848

(22) PCT Filed: Jun. 30, 2016

(86) PCT No.: PCT/JP2016/069556
§ 371 (c)(1),
(2) Date: Dec. 21, 2017

(87) PCT Pub. No.: WO2017/002949
PCT Pub. Date: Jan. 5, 2017

(65) Prior Publication Data
US 2018/0183313 A1 Jun. 28, 2018

(30) Foreign Application Priority Data

Jul. 1, 2015 (JP) .................................. 2015-132751

(51) Int. Cl.
*H02K 41/00* (2006.01)
*H02K 41/035* (2006.01)
(Continued)

(52) U.S. Cl.
CPC ......... *H02K 41/0356* (2013.01); *H02K 5/167* (2013.01); *H02K 5/24* (2013.01); *H02K 33/16* (2013.01)

(58) Field of Classification Search
CPC ........ H02K 33/02; H02K 33/12; H02K 33/16; H02K 33/00; H02K 33/06; H02K 33/18; H02K 35/02; B06B 1/02
(Continued)

(56) References Cited

U.S. PATENT DOCUMENTS 6,326,706 B1 * 12/2001 Zhang ................... F04B 35/045
310/12.24
8,188,623 B2 * 5/2012 Park ....................... H02K 33/16
310/12.01
(Continued)

FOREIGN PATENT DOCUMENTS

JP 2004-73983 A 3/2004
JP 2004-140902 A 5/2004
(Continued)

OTHER PUBLICATIONS

International Search Report dated Sep. 20, 2016 during the prosecution of in International Application No. PCT/JP2016/069556.

*Primary Examiner* — Mang Tin Bik Lian
*Assistant Examiner* — Leda T Pham
(74) *Attorney, Agent, or Firm* — Troutman Sanders LLP (57) ABSTRACT

A reduction in thickness and a reduction in size in the width direction are enabled while enjoying the benefits of enabling stabilized vibration and superior physical shock durability through the provision of stationary shafts. The linear vibration motor comprises: a movable element that is equipped with a magnet portion and a weight portion; a frame for enclosing the movable element; a coil that is secured to the frame, for driving the magnet portion along the axial direction; an elastic member for applying, to the movable element, an elastic force for repelling the driving force that acts on the magnet portion; and a pair of guide shafts that is arranged along an axial direction, having one end secured to a frame and the other end supporting slidably the movable element.

5 Claims, 5 Drawing Sheets (51) Int. Cl.
*H02K 5/167* (2006.01)
*H02K 5/24* (2006.01)
*H02K 33/16* (2006.01)

(58) Field of Classification Search
USPC .................................................. 310/15–39
See application file for complete search history.

(56) References Cited

U.S. PATENT DOCUMENTS

| 8,937,411 B2* | 1/2015 | Kim ....................... H02K 33/02 |
| --- | --- | --- |
| | | 310/15 |
| 2004/0251748 A1 | 12/2004 | Inagaki et al. |
| 2005/0244290 A1 | 11/2005 | Inagaki et al. |
| 2011/0012441 A1* | 1/2011 | Oh .......................... B06B 1/045 |
| | | 310/25 |
| 2013/0169071 A1* | 7/2013 | Endo ....................... H02K 33/02 |
| | | 310/25 |

FOREIGN PATENT DOCUMENTS

| JP | 2011-97747 A | 5/2011 |
| --- | --- | --- |
| JP | 2012-16153 A | 1/2012 |

\* cited by examiner

LINEAR VIBRATION MOTOR

CROSS-REFERENCE TO RELATED APPLICATIONS

This is a U.S. national phase application under 35 U.S.C. § 371 of International Patent Application No. PCT/JP2016/069556, filed Jun. 30, 2016, and claims benefit of priority to Japanese Patent Application No. 2015-132751, filed Jul. 1, 2015. The entire contents of these applications are hereby incorporated by reference.

FIELD OF TECHNOLOGY

The present invention relates to a linear vibration motor.

BACKGROUND

Vibration motors (or "vibration actuators") are built into mobile electronic devices, and are broadly used as devices to communicate to the user, through a vibration, that there is an incoming call, or that a signal, such as an alarm, has been generated, and have become indispensable devices in wearable devices, which are carried on the body of the user. Moreover, in recent years vibration motors have been of interest as devices by which to achieve haptics (skin-sensed feedback) in the human interfaces such as touch panels.

Among the various types of vibration motors under development, linear vibration motors that are able to generate relatively large vibrations through linearly reciprocating vibrations are of particular interest. This linear vibration motor provided with a straight stationary shaft, and a movable element is vibrated therealong, making it possible to achieve stabilized vibration, and making it possible to achieve resistance to damage, such as when there is a drop impact, through the movable element being held by the stationary shaft.

In the prior art for linear vibration motors equipped with stationary shafts, there have been proposals for one wherein a weight and a magnet are disposed on a movable element side, wherein an electric current is applied to a coil that is provided on the stator side to apply a driving force (a Lorentz force) to a magnet, wherein a through hole is formed through the movable element in the vibration direction and a single stationary shaft passes through the through hole (Japanese Unexamined Patent Application Publication 2012-16153), and one wherein two stationary shafts are provided along the vibration direction, and a coil and a magnet are provided between the stationary shafts, where the movable element is supported slidably by the two stationary shafts (Japanese Unexamined Patent Application Publication 2011-97747), and the like.

SUMMARY

With smaller and thinner mobile electronic devices and wearable electronic devices there is the need for smaller and thinner vibration motors to be equipped therein. In particular, in electronic devices such as smart phones that are equipped with flat panel displaying portions, space within the devices is limited in the direction of thickness, perpendicular to the plane of the display, so there is a strong need for thinner vibration motors to be equipped therein.

When one considers reducing the thickness of a linear vibration motor that is provided with a stationary shaft, in the first of the prior art technologies, a through hole is formed along the direction of vibration in a movable element wherein a weight portion is connected to a magnet along the direction of vibration, and thus a through hole is formed in the magnet itself, requiring the magnet to be adequately thick, in respect to the diameter of the stationary shaft, in order to secure an adequate volume for the magnet, to thereby produce the desired driving force. Moreover, the driving portion is structured through the provision also of a coil around the magnet, and thus there is a problem in that this is not completely compatible with reducing thickness.

If two stationary shafts are provided and a coil and a magnet are provided therebetween, as in the latter of the prior art technologies described above, it would not be necessary to form a through hole through the magnet, thus enabling the magnet to be made thinner. However, because two stationary shafts are provided, on both sides of the magnet, a problem is produced in that the width of the linear vibration motor is wide. In recent years there have been requests for linear vibration motors that are to be installed in miniaturized electronic devices to be more compact, not only in the thickness direction, but in the width direction as well.

Moreover, because in both of the prior art technologies set forth above coil springs are provided around the stationary shafts, of necessity the diameters of the coil springs must be larger than the diameters of the stationary shafts. Because the diameters of the stationary shafts must, to some degree, be large to facilitate processing of components and in order to produce a stabilized vibration, there is a problem in that the provision of coil springs with diameters even larger than those would cause a reduction in thickness difficult.

In the present invention, the handling of such problems is an example of the problem to be solved. That is, objects of the present invention include the ability to reduce the thickness or the size in the width direction while also obtaining the benefit of superior ability to withstand physical shocks along with the ability to produce stabilized vibrations through the provision of a stationary shaft, and further to enable a reduction in thickness or a reduction in size in the width direction while preventing a reduction in volume of the magnet and a reduction in volume of the weight.

In order to achieve such an object, the linear vibration motor of the present invention is equipped with the following structures:

A linear vibration motor comprising: a movable element equipped with a magnet portion and a weight portion; a frame for containing the movable element; a coil, secured to the frame, for driving the magnet portion along an axial direction; an elastic member for applying, to the movable element, an elastic force that opposes the driving force that is applied to the magnet; and a pair of guide shafts that is arranged along an axial direction, having one end of each secured to a frame and the free end side of each supporting the movable element slidably.

A linear vibration motor according to the present invention, having distinctive features such as are described above, has stabilized vibration, superior durability to mechanical shock, and can be made thinner or be reduced in size in the width direction. Moreover, it enables prevention of a reduction in volume of the magnet portion and of a reduction in volume of the weight portion.

DETAILED DESCRIPTION

Figure 1:
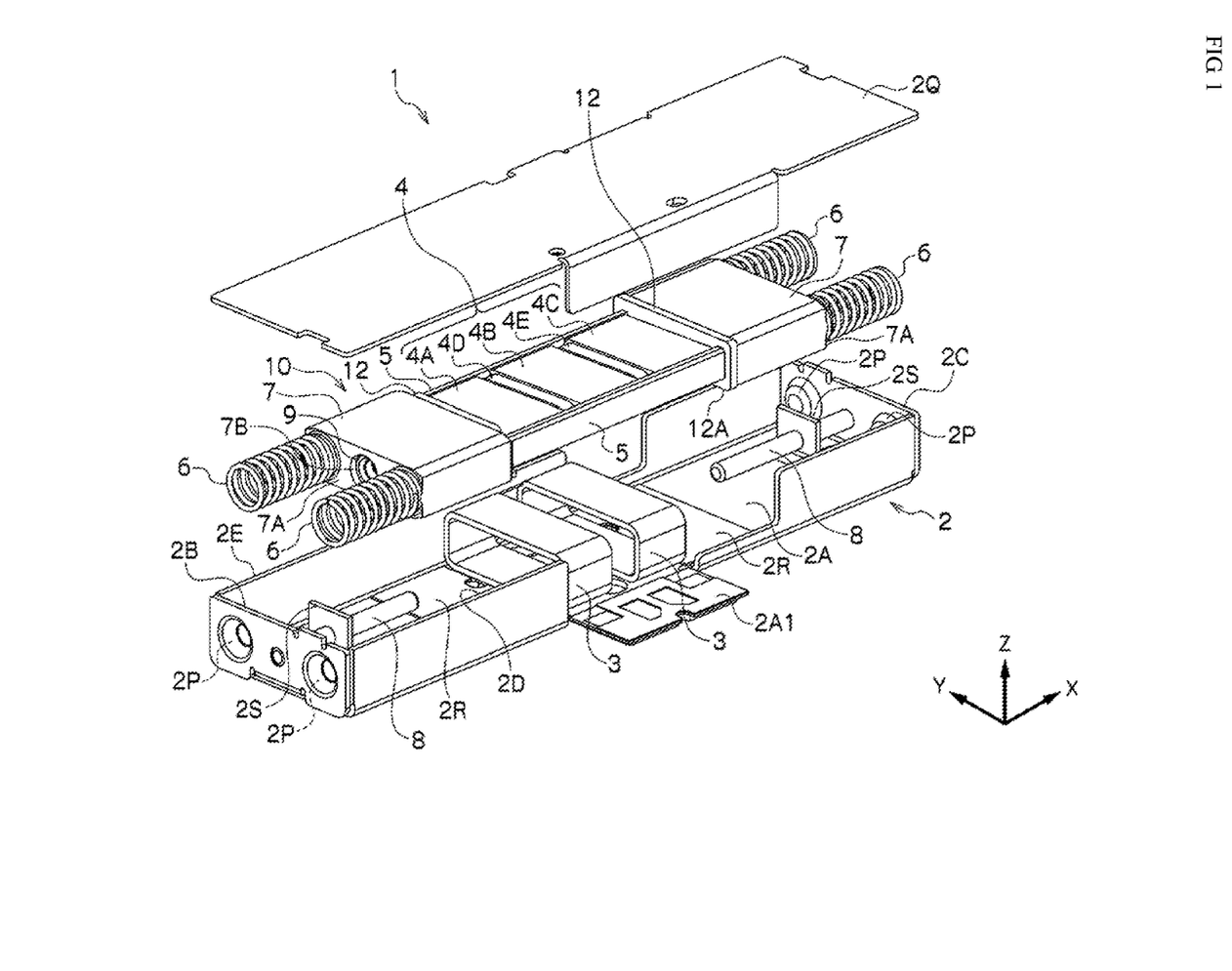
FIG. 1 is an explanatory diagram (an assembly perspective diagram) illustrating a linear vibration motor according to an embodiment according to the present invention.
Figure 2:
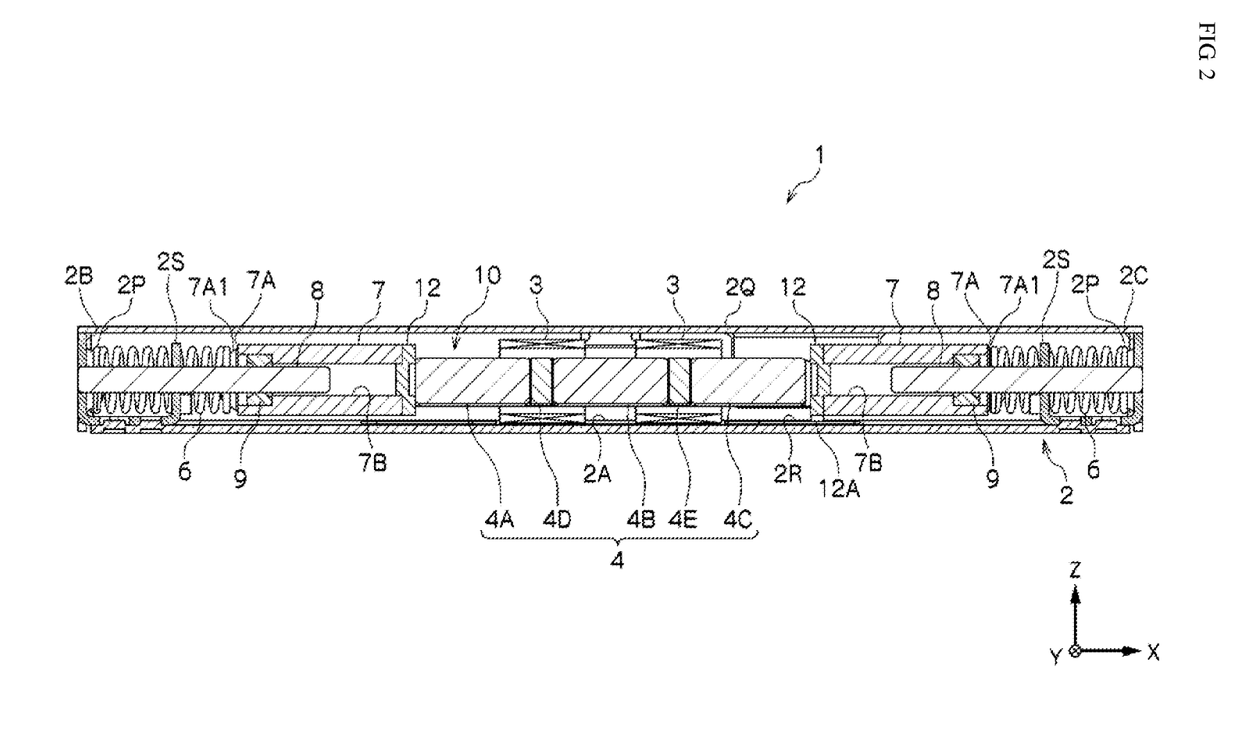
FIG. 2 is an explanatory diagram (a cross-sectional view) illustrating a linear vibration motor according to an embodiment according to the present invention.
Figure 3:
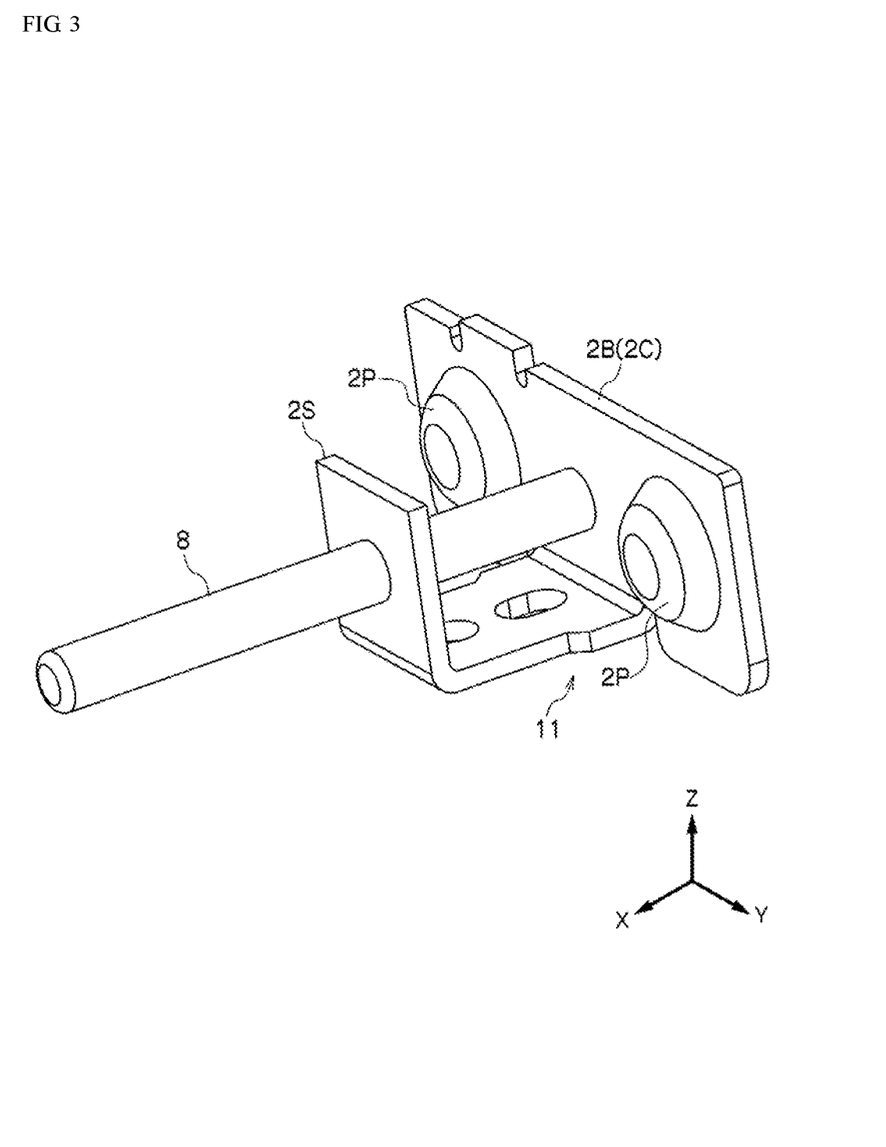
FIG. 3 is an explanatory diagram (a perspective diagram) illustrating a guide shaft and a guide shaft supporting member of a linear vibration motor according to an embodiment according to the present invention.

Embodiment according to the present invention will be explained below in reference to the drawings (where identical reference symbols in different drawings below indicate identical positions, and redundant explanations in the various drawings are omitted). FIG. 1 through FIG. 3 illustrate the overall structure of a linear vibration motor according to one embodiment according to the present invention. The X direction in each of the drawings indicates the direction of vibration (the axial direction), the Y direction indicates the width direction, and the Z direction indicates the thickness (height) direction.

The linear vibration motor 1 comprises: a movable element 10 that is equipped with a magnet portion 4 and a weight portion 7; a frame 2 for enclosing the movable element 10; a coil 3 that is secured to the frame 2, for driving the magnet portion 4 along the axial direction; and an elastic member 6 for applying, to the movable element 10, an elastic force for repelling the driving force that acts on the magnet portion 4.

The frame 2 may have a frame structure that is able to contain the various portions; however, in the example that is illustrated, side walls 2B, 2C, 2D, and 2E are provided extending from the periphery of a rectangular bottom face 2A. Moreover, the frame 2, as necessary, is provided with a cover plate 2Q for covering that which is contained within the frame 2. The cover plate 2Q is formed in a rectangular plate shape that is attached to the top end faces of the side walls 2B through 2E. The frame 2 can be formed through machining (pressing processes, etc.) on a metal plate. In the example that is illustrated, the frame 2 has an essentially rectangular solid shape (a box shape) wherein the dimension in the direction of thickness (the Z direction in the figure) is less than the dimension in the direction of width (the Y direction in the figure), and the dimension in the direction of vibration (the X direction) in the figure is greater than the dimension in the width direction.

A linear driving motor 1 is structured from a coil 3 that is secured to the frame 2, and a magnet portion 4 that is a portion of the movable element 10. By inputting a vibration generating current from a single inputting portion 2A1, provided on the frame 2, into a coil 3, that is secured on the frame 2, a Lorentz force (driving force) along the axial direction (the X direction in the figure) is produced in the magnet portion 4.

In the magnet portion 4, flat rectangular magnet pieces 4A, 4B, and 4C that have polarities along the axial direction (the X direction in the figure) are multiply disposed with identical poles facing each other, connected with spacer yokes 4D and 4E interposed therebetween. If necessary, a reinforcing plate 5 is secured to a side face of the magnet portion 4 to increase the rigidity of the magnet portion 4 thereby.

In the coil 3, an electric wire is wound along the Y and Z directions around the magnet portion 4 wherein the direction of the magnetic pole faces the X direction, with the top face and/or bottom face of the coil 6 and, if necessary, a side face thereof as well, secured to the inner surface of the frame 2. Securing of the coil 3 to the frame 2 may be through securing directly to the frame 2, or the coil 3 may be wound onto a coil bobbin with the coil bobbin secured to the frame 2.

In the example that is illustrated, in the movable element 10, weight portions 7 are connected to both end portions of the magnet portion 4 in the axial direction (the X direction in the figure). The weight portion 7 may be structured through, for example, a metal material with a relatively high specific gravity (such as tungsten), and, in the example that is illustrated, has an essentially rectangular solid shape that has a Z-direction height that is greater than the thickness of the magnet portion 4, and a width in the Y direction that is greater than the width of the magnet portion 4. The weight portion 7 is connected to the magnet portion 4 through a connecting member 12.

A pair of guide shafts 8 is secured in the frame 2. This pair of guide shafts 8 is disposed divided along the axial direction (the X direction in the figure), with one end side secured to the frame 2, and the other end side (the free end side) being supported slidably in the movable element 10. In the example in the figure, the pair of guide shafts 8 is arranged so that the centers thereof are coincident. Note that the pair of guide shafts 8 may be disposed along the axial direction, and the axes thereof may be lined up so as to be in parallel with each other.

In the example in the figure, one end side of each of the pair of guide shafts 8 is supported on the frame 2 at two points. Specifically, the end portion of the guide shaft 8 is secured to the side wall 2B or 2C of the frame 2, and, further, is supported by a supporting portion 2S that is away from the end portions of the guide shaft 8.

As illustrated in FIG. 3, the sidewall 2B or 2C, and the supporting portion 2S can be formed integrally as a single guide shaft supporting member 11. In the example in the figure, and extending portion is provided on the sidewall 2B or 2C, extending in the axial direction, where the tip end portion thereof is bent so as to form the supporting portion 2S. As shown in the figure, the guide shaft supporting portion 11 may be structured as a single assembled component in the state wherein the guide shaft 8 is supported.

A hole 7B, into which the free end side (the other end side) of the guide shaft 8 is inserted is provided along the axial direction (the X direction in the figure) in the movable element 10. A bearing 9, which enables the guide shaft 8 to slide in the X direction, is provided in the interior of the hole 7B, where the other end side of the guide shaft 8 is supported thereby on the movable element 10 so as to be able to slide on the bearing 9. The hole 7B that is provided in the movable element 10 is provided in the weight portion 7 of the movable element 10, where there is no hole in the magnet portion 4 of the movable element 10. In this way, each of the guide shafts 8 is held cantilevered relative to the frame 2, and the magnet portion 4 is provided on extension lines of the free end sides (the other end sides) thereof.

The elastic members 6 are disposed non-coaxially with the pair of guide shafts 8 along the axial direction, and apply, to the movable element 10, elastic forces that oppose the driving forces produced by the coil 3 and the magnet portion 4. In the example that is illustrated, coil springs that extend and compress along one axial direction (the X direction) are used as the elastic members 6, where on one side two elastic members 6 are disposed between the weight portion 7 and the side walls 2B and 2C of the frame 2. In the example that is illustrated, the axis of the elastic members 6 is disposed so as to be parallel to the pair of guide shafts 8. Given this, one end of the elastic member 6 engages with a supporting protrusion 2P that is provided on the side wall 2B or 2C of the frame 2, and the other end of the elastic member 6 engages with a supporting protrusion 7A1 that is provided on the end portion 7A of the weight portion 7.

The operation of such a linear vibration motor 1 will be explained. When not driven, the movable element 10 stands still in the vibration center position wherein the elastic forces of the elastic members 6 are in equilibrium. Given this, when the vibration generating current of a resonant frequency that is determined by the mass of the movable element 10 and the coefficient of elasticity of the elastic members 6 is inputted into the coil 3, a driving force in the X direction is applied to the magnet portion 4, and the movable element 10 is caused, by the driving force and the elastic repelling force of the elastic members 6, to undergo reciprocating vibration along the axial direction.

Given such a linear vibration motor 1, the pair of guide shafts 8 does not pass through the magnet 4, making it possible to secure a magnet volume that is able to produce an adequate driving force through a magnet 4 that is thin in the Z direction and wide in the Y direction, regardless of the diameter of the pair of guide shafts 8. This enables the production of a thin linear vibration motor 1 able to produce a sufficient driving force. In contrast, in a type wherein the stationary shaft passes through the magnet portion, as it does in the prior art, the thickness of the magnet must be quite large when compared to the stationary shaft in order to produce an adequate driving force, and is coiled therearound, making it difficult to reduce adequately the thickness when considering the diameter of the stationary shaft and the driving force.

Moreover, the linear vibration motor 1 according to an embodiment according to the present invention, wherein the movable element 10 is supported by the pair of guide shafts 8 is able to reduce the width on the left and the right, because there is no need for shaft placement space on the left and right of the magnet portion 4, when compared to the prior art wherein a pair of stationary shafts that extend along the direction of vibration is provided on both the left and the right sides of the magnet.

Given this, the weight portion 7 of the linear vibration motor 1 in the embodiment in the present invention can be formed in a parallelepiped-shape, and holes 7B that are enough for the guide shafts 8 to pass therethrough may be formed therein, enabling the volume of the weight portion 7 to be adequately large. This makes it possible to ensure adequate mass for the movable element 100 to produce the inertial forces for vibration.

Furthermore, disposing the elastic members 6 off-axis in relation to the pair of guide shafts 8 enables a reduction in the diameter of the elastic members 6 regardless of the diameter of the pair of guide shafts 8. When the diameters of the elastic members 6 are reduced, the elastic force can be set as appropriate through the selection of the material for the elastic members 6, and through providing a plurality of elastic members 6 in parallel. This can also reduce the thickness of a linear vibration motor 1 wherein a movable element 10 is supported on a shaft.

At this time, the movable element 10 that is supported by the pair of guide shafts 8 may rotate around the pair of guide shafts 8, and both the left and right side of the movable element 10 may rotate upward and downward. In contrast, the bottom portion of the connecting member 12 for connecting the weight portion 7 and the magnet portion 4 is provided so as to protrude from the weight portion 7, to be a contacting portion 12A, where a slide bearing portion 2R, with which the contacting portion 12A of the connecting portion 12 make sliding contact, is provided on the inner surface of the frame 2. Given this, when the slide bearing portion 2R is formed from a resin material, or the like, this can preserve stabilized vibration through enabling suppression of the production of noise, or the like, when the contacting portion 12A of the connecting member 12 contacts the inner surface of the frame 2.

In this type of linear vibration motor 1, preferably the position of the magnet portion 4 that is connected to the weight portion 7 of the movable element 10 is disposed in the axial-direction center of the weight portion 7. Arranging the magnet portion 4 in this way causes the magnetic attraction that acts between the magnet portion 4 and the bottom face 2A of the frame 2, which is made from metal, to act uniformly on the left and on the right, enabling the vibration of the movable element 10 to be stabilized when compared to a case wherein the effect of the magnetic attraction is biased toward either the left or the right.

Figure 4:
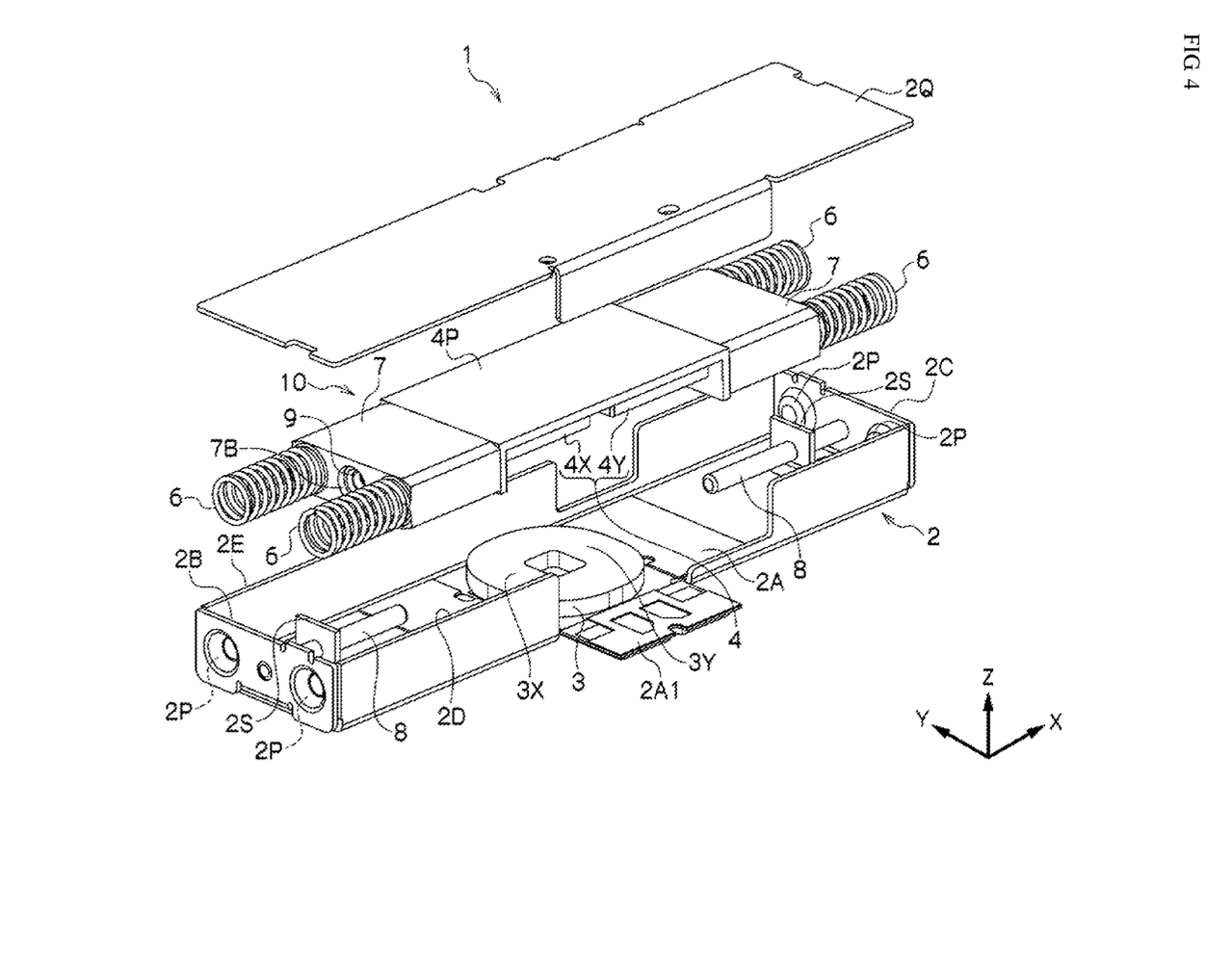
FIG. 4 is an explanatory diagram (an assembly perspective diagram) illustrating another embodiment of a linear vibration motor according to the present invention.

FIG. 4 illustrates another form of a linear vibration motor 1 according an embodiment according to the present invention. In this example embodiment, the layout structure of the magnet portion 4 and the coil 3 is different, but the other structures are the same as in the example embodiment described above. In this example, in the magnet portion 4 in the movable element 10, magnet pieces 4X and 4Y, which are magnetized in mutually opposing directions along the Z direction in the figure, are supported on a magnet supporting member 4P, and connected to the weight portion 7. In contrast, a coil 3, which has straight portions 3X and 3Y along the Y direction in the figure, is secured to the bottom face 2A of the frame 2, and the straight portions 3X and 3Y of the coil 3 are arranged so as to face the magnet pieces 4X and 4Y, respectively. Given this, in the same manner as in the example described above, with this magnet portion 4 and coil 3 as well, when the vibration generating current is inputted into the coil 3, a driving force in the X direction is applied to the magnet portion 4, and the movable element 10 is caused, by the driving force and the elastic repelling force of the elastic members 6, to undergo reciprocating vibration along the axial direction.

As explained above, in the linear vibration motor 1 according to the present embodiment of the present invention the movable element 10 vibrates supported by the pair of guide shafts 8, making it possible to produce a stabilized vibration and possible to produce resistance to damage when there is a drop impact, or the like, in the same manner as if a stationary shaft were provided. Additionally, such a linear vibration motor 1 can be made thinner and more compact in the width direction, while suppressing a reduction in the volume of the magnet portion 4 and the weight portion 7.

Figure 5:
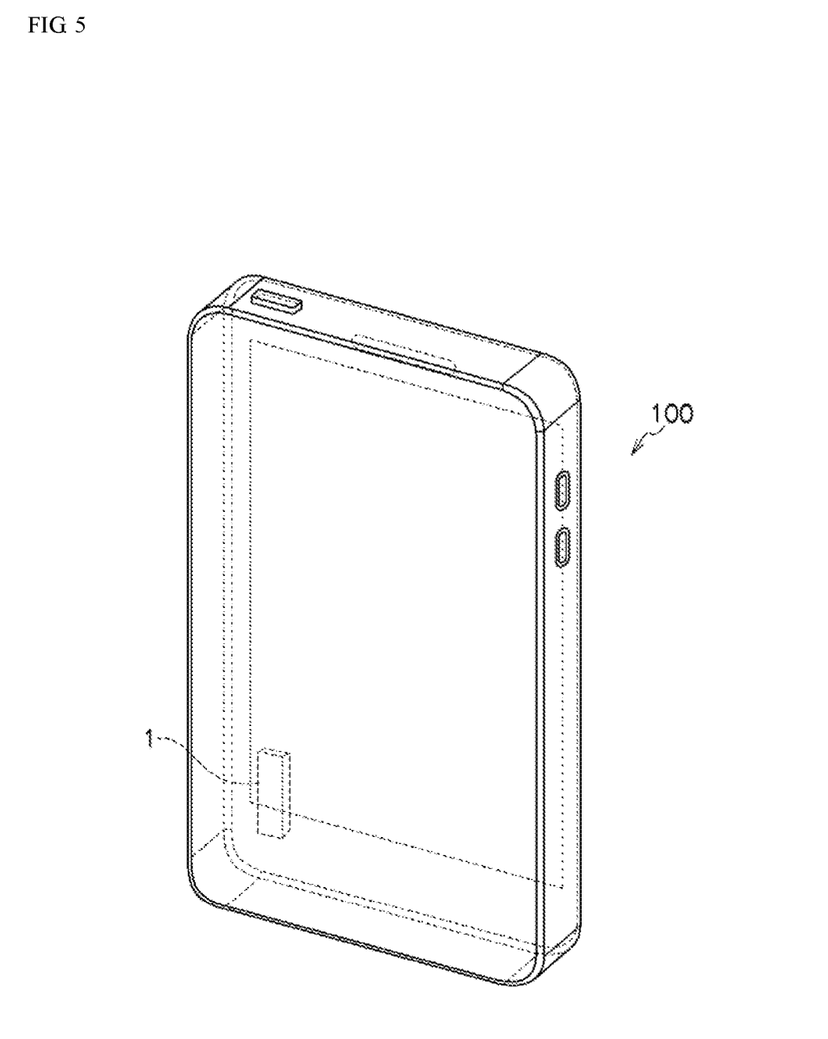
FIG. 5 is an explanatory diagram illustrating the electronic device (a mobile information terminal) equipped with a linear vibration motor according to an embodiment according to the present invention.

FIG. 5 shows a mobile information terminal 100 as an example of an electronic device equipped with a linear vibration motor 1 according to an embodiment according to the present invention. The mobile information terminal 100 that is equipped with the linear vibration motor 1 that can produce a stabilized vibration and for which the thickness can be reduced and which can be made more compact in the width direction enables the user to be notified through a stabilized vibration that does not tend to produce noise, when there is an incoming call in a communication function or at the beginning or end of an operation such as an alarm function. Moreover, this makes it possible to produce a mobile information terminal 100 with high mobility and which facilitates design performance, through the linear vibration motor 1 having reduced thickness and being more compact in the width direction. Furthermore, because the linear vibration motor 1 is of a compact shape wherein the various components are contained within a frame 2 of a rectangular shape wherein the thickness is suppressed, it can be mounted, with excellent space efficiency, within a thinner mobile information terminal 100.

While embodiments according to the present invention were described in detail above, referencing the drawings, the specific structures thereof are not limited to these embodiments, but rather design variations within a range that does not deviate from the spirit and intent of the present invention are also included in the present invention. Moreover, insofar as there are no particular contradictions or problems in purposes or structures, or the like, the technologies of the various embodiments described above may be used together in combination.

The invention claimed is:

1. A linear vibration motor comprising:
    a movable element equipped with a magnet portion and a weight portion;
    a frame containing the movable element;
    a coil, secured to the frame, driving the magnet portion along an axial direction;
    an elastic member applying, to the movable element, an elastic force that opposes a driving force that is applied to the magnet;
    a first guide shaft arranged along an axial direction, having one end secured to the frame and a free end side supporting the movable element slidably; and
    a second guide shaft arranged along an axial direction, having one end secured to the frame and a free end side supporting the movable element slidably,
    wherein at least one of the first and the second guide shaft is supported on two points, by a sidewall of the frame, which is perpendicular to the axial direction,
    wherein the sidewall includes an extending portion that extends in the axial direction,
    wherein a tip end portion of the extending portion is bent so as to form a supporting portion,
    wherein the supporting portion supports the at least one of the first and the second guide shaft, and
    wherein the supporting portion defines an opening that allows the at least one of the first and the second guide shaft to extend through.

2. The linear vibration motor as set forth in claim 1, wherein:
    in the movable element, a hole for insertion of at least one of the first and second guide shaft, and a bearing for supporting the at least one of the first and second guide shaft slidably, are provided in the weight portion.

3. The linear vibration motor as set forth in claim 1, wherein:
    at least one of the first and the second guide shaft is supported at two points on one end side.

4. The linear vibration motor as set forth in claim 1, wherein:
    the first and the second guide shafts and the elastic member are disposed non-coaxially.

5. The mobile information terminal comprising a linear vibration motor as set forth in claim 1.

* * * * *